United States Patent Office 2,960,314
Patented Nov. 15, 1960

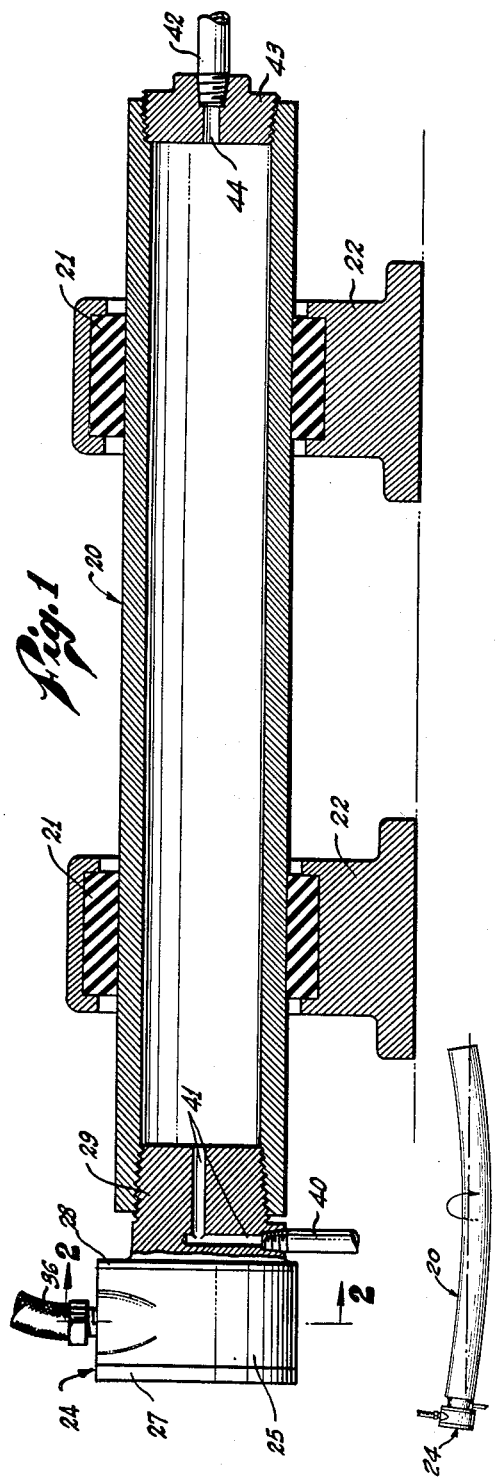
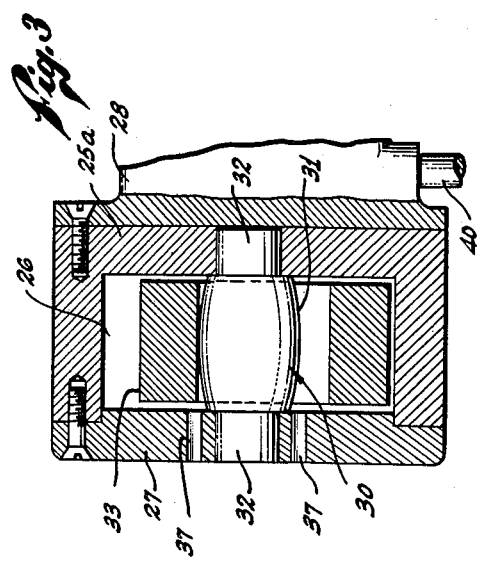
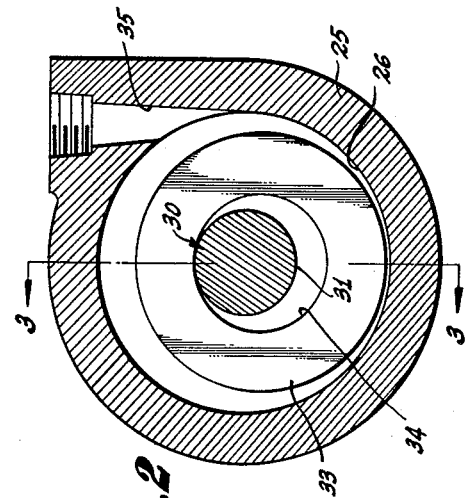
INVENTOR.
ALBERT G. BODINE JR.
BY Lilly & Nyhagen
Attorneys Nov. 15, 1960
A. G. BODINE, JR
2,960,314
METHOD AND APPARATUS FOR GENERATING AND
TRANSMITTING SONIC VIBRATIONS
Filed July 6, 1959
7 Sheets-Sheet 2
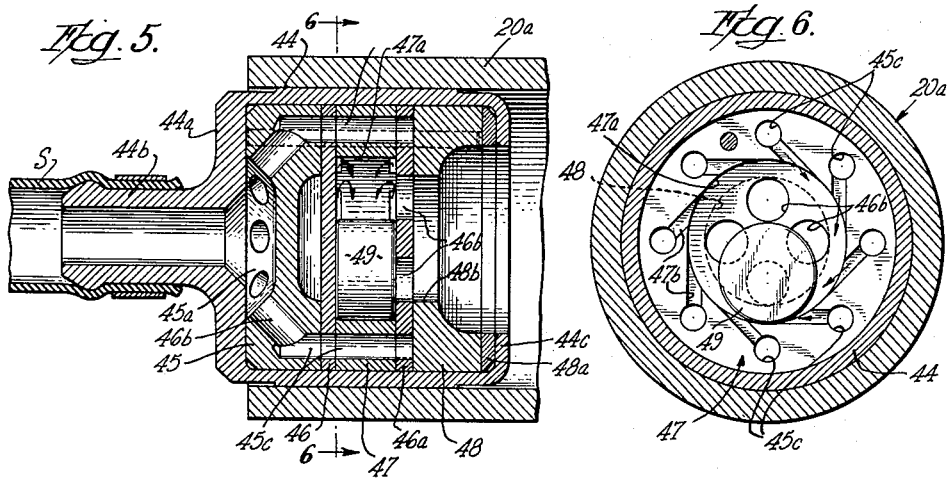
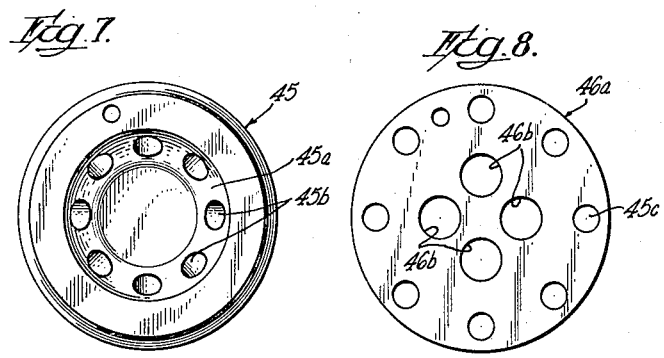
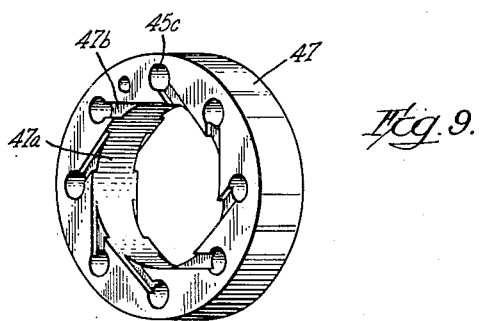
INVENTOR.
ALBERT G. BODINE, JR.
BY Lilly & Nyhagen
ATTORNEYS Nov. 15, 1960     A. G. BODINE, JR     2,960,314
METHOD AND APPARATUS FOR GENERATING AND
TRANSMITTING SONIC VIBRATIONS
Filed July 6, 1959     7 Sheets-Sheet 3
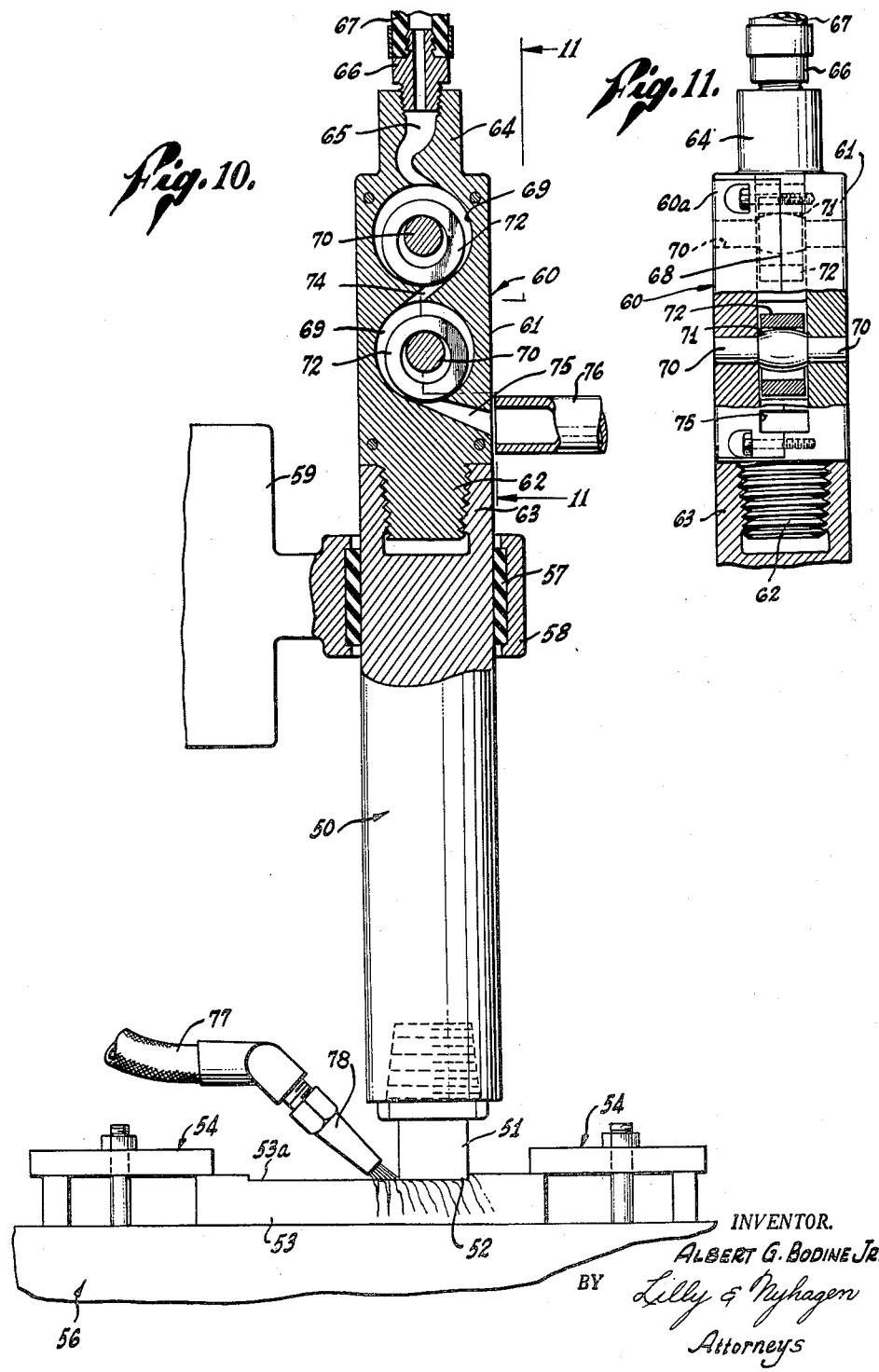
INVENTOR.
ALBERT G. BODINE JR.
BY Lilly & Nyhagen
Attorneys

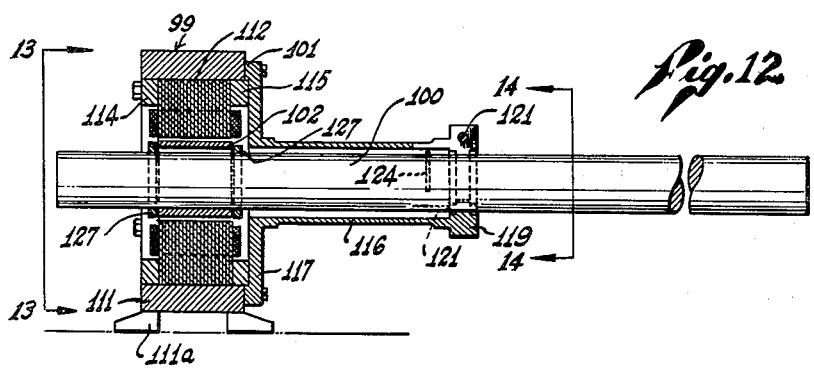
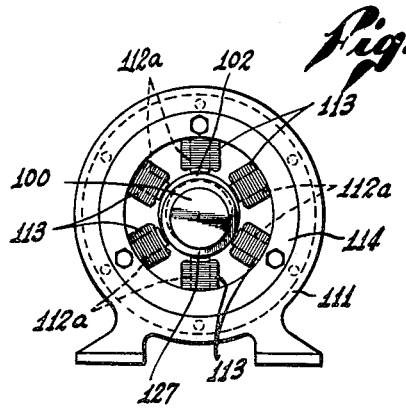
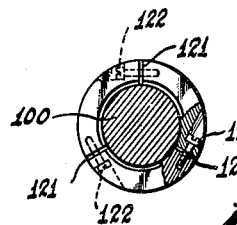
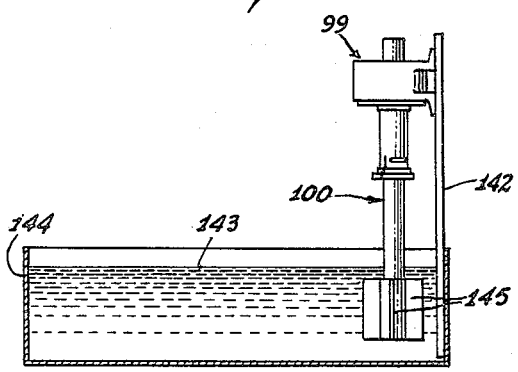
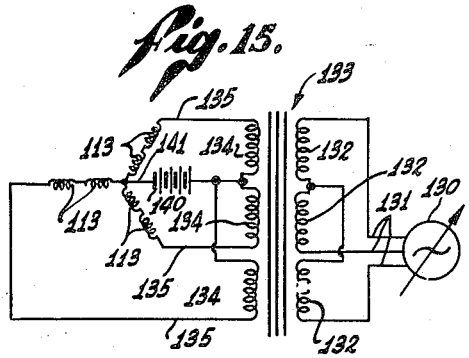
INVENTOR.
ALBERT G. BODINE JR.
BY Lilly & Nyhagen
Attorneys

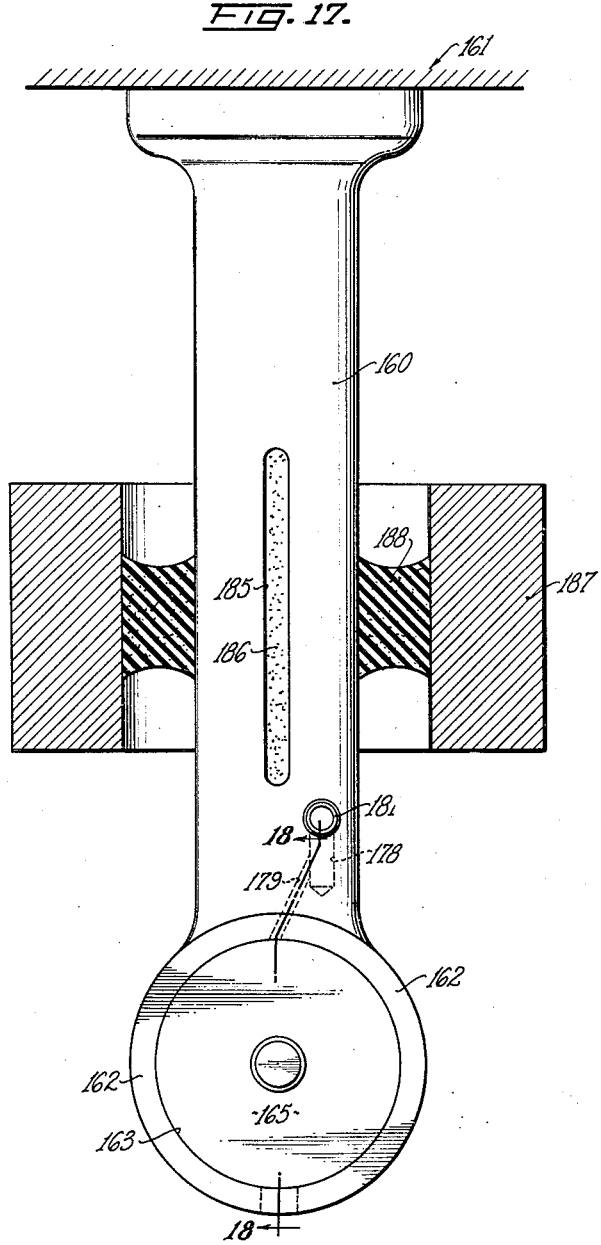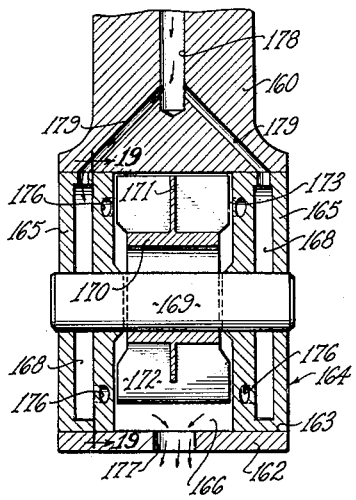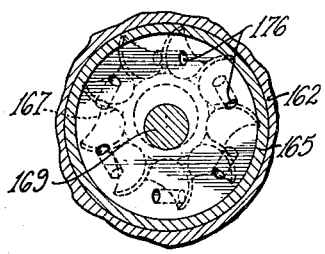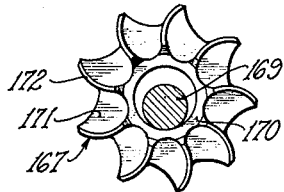

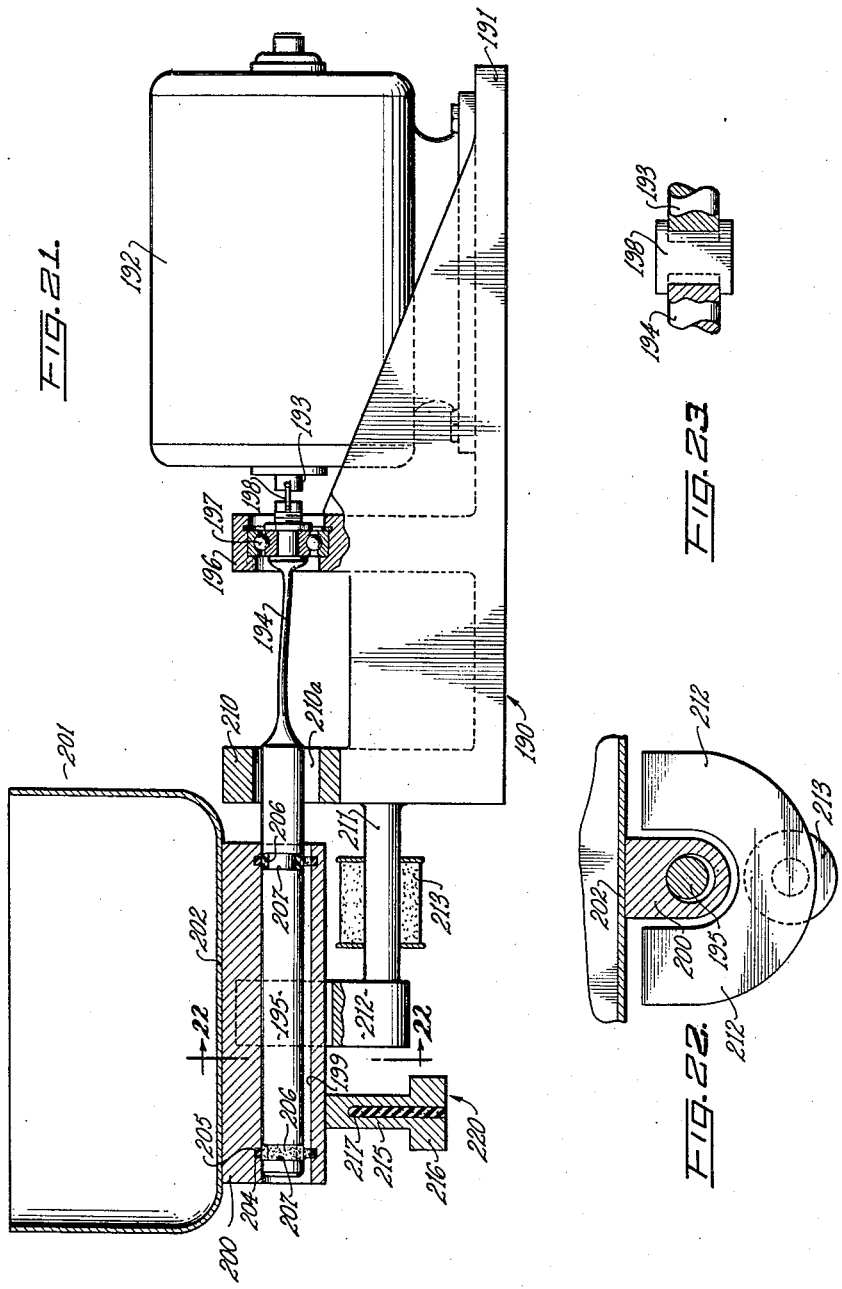

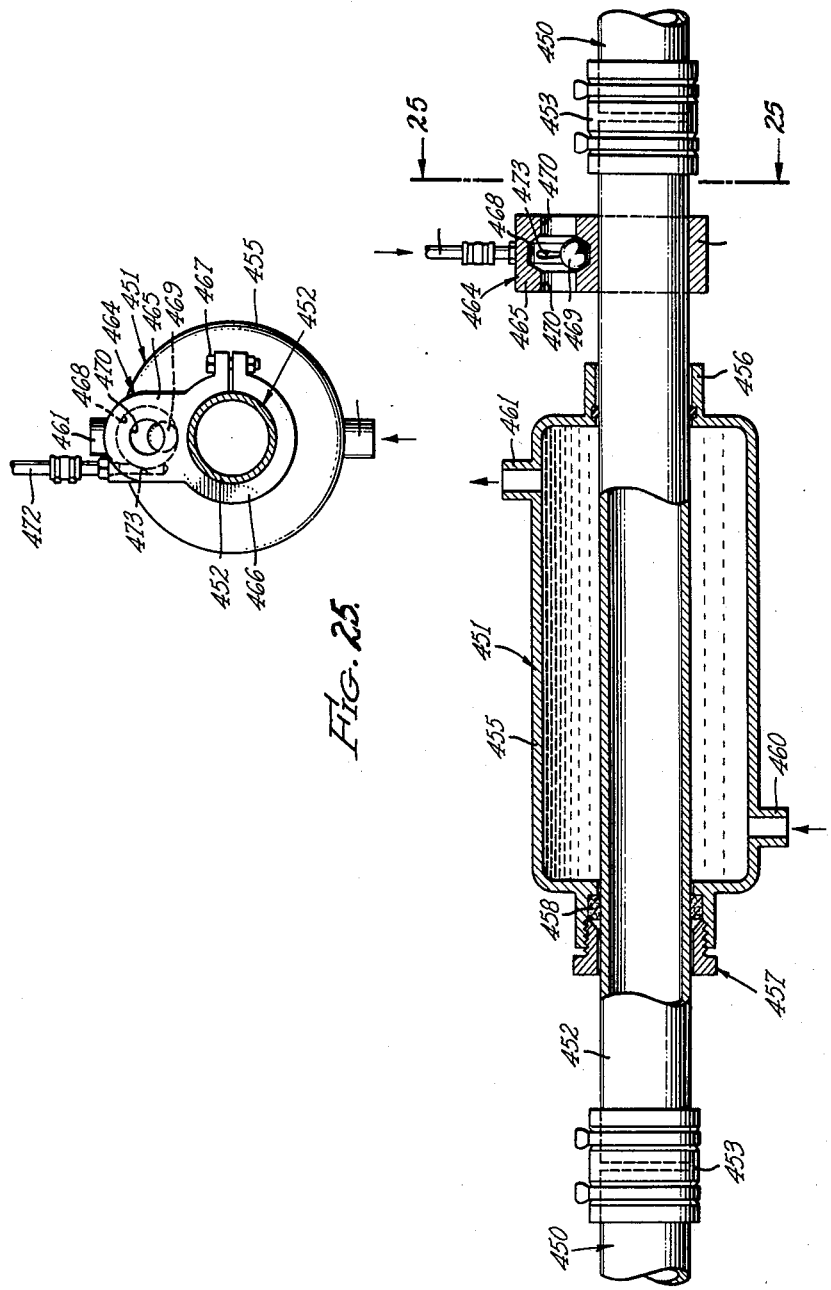

2,960,314
METHOD AND APPARATUS FOR GENERATING AND TRANSMITTING SONIC VIBRATIONS

Albert G. Bodine, Jr., 13120 Moorpark St., Sherman Oaks, Calif.

Filed July 6, 1959, Ser. No. 825,117

30 Claims. (Cl. 257—73)

This invention relates generally to methods and apparatus for the generation and transmission of relatively high power by means of intense sonic vibrations, particularly for generation or transmission of sonic vibrations in resonant vibratory mechanical devices, either elastically deformable vibratory bodies of the distributed constant class, or elastically supported bodily vibratory devices of lumped constant characteristics.

This application is a continuation-in-part of my prior applications as follows: Serial No. 313,175, filed October 4, 1952, for Method and Apparatus for Generating and Transmitting Sonic Vibrations, allowed April 14, 1958, now abandoned; Serial No. 771,808, filed September 2, 1947, entitled Apparatus for Boundary Layer Control, now abandoned; Serial No. 484,627, filed January 28, 1955, entitled Apparatus for Generating and Transmitting Sonic Vibrations, now abandoned; Serial No. 572,432, filed March 19, 1956, for Sonic Materials Separation Process and Apparatus; and Serial No. 772,270, filed November 6, 1958, for Method and Apparatus for Generating and Transmitting Sonic Vibrations.

A large number of industrial uses for high power sonic vibrations have been discovered. It is known, for example, that intense sonic energy may be applied to gases, liquids or solids to produce certain desired chemical or physical effects. Many types of power tools or other equipment are operated by sonic energy of high intensity. One illustrative example involves a longitudinally extended elastic bar, in which a longitudinal resonant standing wave is set up and maintained, so that an end portion of the bar becomes the location of a velocity antinode of such standing wave, and is utilized to vibrate a bit or other tool against the work. Other modes of vibration, such as lateral or gyratory, are within the scope of the invention. Other illustrative examples will appear in the ensuing description.

The bodies or devices to be sonically vibrated at resonance are often characterized by high acoustic impedance. They vibrate with great force, and with small velocity amplitude. The problem of driving these devices, i.e., the provision of an effective vibration generator suited thereto, is often very difficult, particularly in view of the fact that ordinary practically available sources of motivating power operate at low impedance, characterized by driver elements moving with relatively low force but substantial velocity. Ordinary low impedance drivers are incapable of driving high impedance devices because of the mismatch of impedance. The efficiency of transduction has been characteristically low.

The common sonic generators, such as magneto-striction bars, crystals, etc., are capable of a motion of only a few feet per second by reason of limitations set by elastic strain limits, which motion I have found to be entirely inadequate for high power applications.

Mechanical generators are known which have the requisite motional characteristics, but suffer from complexity and a host of ensuing problems. Any degree of complexity of moving parts results in various vibratory interactions taking place at high frequency between these parts, with consequent high energy loss and frequent destruction of parts in high stress applications. At very high frequencies gears will chatter, bearing separators seize and fracture, and the individual balls or rollers of anti-friction bearings are forced to rotate so fast they become unstable in their motion. Plain journal bearings seize and overheat. The power of previously known generators has been relatively low, particularly at the higher frequencies; and the ruggedness required of an industrial machine has been lacking. Many proposed industrial applications of sonic power have been correspondingly handicapped.

It is accordingly the primary general object of the present invention to provide novel and improved sonic vibration generating methods and apparatus particularly suited to various industrial applications and characterized by relatively high power output, efficiency of transduction, simplicity and ruggedness.

A further object is the provision of an extremely simple system for effectively driving a high impedance vibratory device from a low impedance source of motive power.

A further object, and another aspect of the invention, comprises the provision of a method and means for mechanically transmitting increased amounts of generated sonic power to a work point distant from the generator.

A still further object is the provision of methods and apparatus for utilizing sonic vibrations to achieve, on an industrial scale, results heretofore obtained only in the laboratory.

A further and more particular object of the invention is to provide improved sonic generating and transmission methods and apparatus for the continuous and uniform treatment of fluids or liquids by sonic vibrations, and it is a still more specific object to provide improved vibration generators and transmission means in heat exchange apparatus and the like.

The invention provides, in one primary aspect, a unique sonic vibration process and processing means involving the driving of an inertia-mass rotor in a cyclic or orbital path under guiding constraint of a stroke limiting or bearing means, whereby a periodic force impulse is exerted on the latter, and the coupling of this bearing means to a vibratory device having a resonant frequency range whereby said periodic force impulse, or a component thereof, is effective to vibrate said device in said range. To this end, the rotor is driven at an orbital frequency which generates a vibration frequency in the range of resonance for the driven vibratory device. I have discovered that the driven vibratory device, when so vibrating in its resonance range, with its vibration amplitude amplified by resonance, back-reacts with the orbital rotor, strongly constraining the rotor to an orbital periodicity corresponding to its own resonant frequency. I have further discovered that the apparatus tends inherently to operate on the low side of the frequency for peak resonant amplitude, and further, that the whole apparatus, driven vibratory device and orbiting rotor, tends to lock in synchronously slightly below the frequency for peak resonant amplitude. The orbiting rotor is strongly constrained to produce this frequency, and although it could of course be strongly enough driven to reach a threshold condition where it would reach and break over peak amplitude resonance frequency, considerable increase in driving effort is required before this unwanted condition occurs. In this connection, it is to be understood that the driving effort on the rotor is limited to a value below such threshold condition. The rotor is hence guarded from over-speeding and destroying itself or its housing when operated at high frequency.

In addition to these effects, the constraint which keeps the frequency of the orbiting rotor to the low side of the resonance curve (amplitude vs. frequency) of the vibratory driven device is effective to establish a phase angle between the rotor motion and the motion of the vibrating device wherein maximum power is delivered from the rotor to the vibrating device for a given power input to the rotor.

It will be evident that such an orbiting rotor generator has high output impedance, while being operable by motive power at low impedance, impedance being understood to be proportional to the ratio of force to velocity. Considering the output side of the generator, where the race for the orbiting rotor is coupled to the vibratory driven device, it will be seen that force will be high owing to the high magnitude of centrifugal force, while the stroke amplitude, and therefore the velocity amplitude, will obviously be low. The desirable high output impedance for the resonant system is therefore attained. Impedance is generally thought of in connection with alternating phenomena such as alternating forces, in comparison with resulting velocity amplitude. The motive power source used in the present instance is typically a continuous air jet, rather than an alternating entity. Nevertheless, the continuous air jet has the characteristic of relatively low force and relatively high velocity, and is, broadly speaking, a form of power having a "low impedance" quality. The generator of the invention thus fulfills the requirement of operating off a low impedance form of power, and delivering power at high impedance.

The illustrative embodiments chosen for disclosure herein are for the most part of the type wherein the resonantly driven device is of the distributed constant type, though without implied limitation thereto. It should be explained that a "distributed constant" system is one wherein the parameters of mass and elasticity governing the resonant vibration frequency are distributed throughout all or a significant part of the vibratory system, as in the ideal example of a tuning fork. By contrast, a "lumped constant" system is one wherein the parameters of mass and elasticity governing the resonant frequency are largely concentrated or localized in discrete elements such as intercoupled masses and springs, respectively. Of cousre, these are idealized classifications. Practical systems usually are mixtures of the two. Thus, practical systems wherein the parameters of mass and elasticity are preponderantly "distributed" will also very commonly have local concentrations of mass, with small capability for elastic vibration therein; while practical systems wherein mass and elasticity are preponderantly localized, as in intercoupled spring and mass elements, will invariably have certain "distributed constant" qualities in view of mass inherently present in spring elements, and elasticity inherently present in mass elements. Thus, the resonantly driven devices of the invention may embody such distributed constant elements as an elastic bar, in which either transverse, gyratory, or longitudinal standing wave action may be set up by the vibration generator. Such bar may be a solid rod, or it may be tubular, as a steel pipe. The term "bar" is often used in the field of acoustics in connection with discussions of elastic wave propagation, without reference to the cross sectional form of the "bar," and the term will be so used herein, both in the specification and claims, thus generically comprehending hollow rods, or pipes, as well as solid rods, I-beams, and other structural shapes.

One aspect of the invention is based on the fact that an elastic bar, properly supported, can be subjected to transverse vibration simultaneously in two directions at right angles, that is, in a manner such that a free end of the bar describes a closed path, which is the resultant of two rectilinear transverse components of vibration. If the bar is of circular section, and the two components are in quadrature and of equal amplitude, the free end describes a circle. If the two components in quadrature are of unequal amplitude, the free end will describe an ellipse. It can readily be seen that the effect of the two quadrature vibratory components is a rotating radially directed force vector which bends the portion of the bar acted upon in a circle, but, of course, without turning the bar bodily on its axis. The advantage of so setitng up a rotating or gyratory deflection of the bar at the point of vibration generation, as compared with a simple uni-directionally transverse vibration, is that for a given amplitude of lateral deflection, a bar so vibrating receives, transmits and delivers twice as much sonic power as in the case of uni-directional transverse vibrations.

Transverse gyratory vibration of an elastic bar of the character indicated results in propagation of an elastic gyratory transverse wave in a direction longitudinally of the elastic bar, each transverse section of the bar remaining in its own plane, and successive transverse sections undergoing gyratory transverse elastic deflection. It can be seen that such elastic wave propagation longitudinally of the bar permits vibratory energy to be taken off from the end of the bar remote from the end at which the vibrations are imparted to the bar.

The orbiting rotor generator of the invention has especially useful properties when coupled to drive the gyratory bar of the system described in the immediately preceding paragraphs, as will appear.

The invention will be further described in connection with the following detailed description of a number of illustrative embodiments thereof, reference being had to the accompanying drawings, in which:

Fig. 1 is a longitudinal sectional view of one embodiment of the invention;

Fig. 2 is a transverse section taken on line 2—2 of Fig. 1;

Fig. 3 is a section taken on line 3—3 of Fig. 2;

Fig. 4 is a diagrammatic view illustrative of a standing wave action characteristic of the apparatus of Fig. 1;

Fig. 5 is a longitudinal sectional view through a modified form of orbiting rotor wave generator, the generator being shown installed in the end portion of a gyratory tube.

Fig. 6 is a transverse section on line 6—6 of Fig. 5;

Fig. 7 is an end elevational view of an air inlet plate of the generator of Fig. 5;

Fig. 8 is an elevation of a wear plate of the generator of Fig. 5;

Fig. 9 is a perspective view of the raceway plate of the generator of Fig. 5;

Fig. 10 is an elevation, partly in longitudinal section, showing another embodiment of the invention;

Fig. 11 is a longitudinal section through the generator of Fig. 10, taken in accordance with line 11—11 of said figure;

Fig. 12 is a longitudinal sectional view of another embodiment of the invention;

Fig. 13 is a view taken in accordance with 13—13 of Fig. 12;

Fig. 14 is a view taken in accordance with line 14—14 of Fig. 12;

Fig. 15 is a view showing an illustrative electrical circuit for the generator of Figs. 12 to 14;

Fig. 16 shows the apparatus of Figs. 12–15 incorporated in a system for generating waves in a body of liquid;

Fig. 17 is a side elevation, partly in medial section, of a modified form of the invention;

Fig. 18 is a section of line 18—18 of Fig. 17;

Fig. 19 is a section on line 19—19 of Fig. 18;

Fig. 20 is a detail side elevation of the rotor of Figs. 18 and 19;

Fig. 21 is a side elevation, partly in medial longitudinal section, showing another form of the invention;

Fig. 22 is a section on line 22—22 of Fig. 21;

Fig. 23 shows a shaft key used in the embodiment of Fig. 21;

Fig. 24 is an elevation, partly in longitudinal section, showing a form of the invention embodied in heat exchange apparatus; and Fig. 25 is a view taken on line 25—25 of Fig. 24.

Figs. 1 to 4 show one illustrative form of the invention applied to the problem of supplying intense sonic energy to liquids or gases to produce desired physical or chemical effects. Many industrial uses for such a process are known and described in the literature and need not be further discussed herein.

The elastic "bar" is here in the form of a tube 20, typically composed of steel, which is carried by spaced rubber blocks or sleeves 21 supported by mountings 22, and these blocks 21 are such as will permit a substantial degree of elastic vibration in all directions in planes transverse of the tube. The tube does not rotate bodily, but portions thereof spaced from the nodal point or points of a standing wave set up in the tube gyrate in a circular path by elastic bending of portions of the tube from its neutral position (see Fig. 4). Such circular motion or gyration is a form of harmonic vibration, being the resultant of two components of linear transverse harmonic vibration occurring at right angles to one another with 90° phase difference. The rubber blocks 21 will be seen to comprise compliant mountings permitting such gyratory action.

The vibration generator, generally designated by numeral 24, comprises a cylindric housing 25 formed with a cylindric chamber 26, preferably though not necessarily, co-axial with the tube 20. This housing 25 is formed with one integral side closure wall 25a, and its opposite side is fitted with a removable closure wall 27. A flanged fitting 28 is secured to the wall 25a, and has a threaded projection 29 screwed into the corresponding end of tube 20. A center pin or axle 30 of circular cross section, preferably formed with a central crowned or barrel-shaped portion 31, has reduced end portions 32 set tightly into the walls 25a and 27. The periphery of this axle 30 provides a circular rolling bearing surface, which is surrounded by an inertia rotor or roller in the form of a ring 33, having a circular, smooth-surfaced central opening 34 of substantially larger diameter than that of pin 30. In some applications the outer periphery of the ring has a small clearance with the periphery of the cavity 26 when hanging on the axle 30, or spinning thereabout.

The inertia ring 33 is caused to roll on its axle 30 by a fluid jet, either air under pressure, steam, or a liquid, introduced through an injection nozzle 35 formed in the housing 25 tangential to the periphery of the circular cavity 26, such fluid being introduced to the nozzle 35 via a hose 36 coupled thereto. The spent driving fluid may be discharged from the chamber 26 in any desired manner; as here shown, it is vented to atmosphere via orifices 37 formed in closure plate 27 as close to the center of the chamber 26 as possible.

The tangentially introduced fluid causes the inertia ring 33 to roll on the axle 30, and the centrifugal force exerted by the rolling ring on the axle 30, and thence transmitted to the housing 25, elastically bends the proximate end portion of the tube 20 and moves it around in a circular path. As earlier pointed out, this motion of the end portion of the tube is a form of harmonic vibration, being the resultant of two perpendicular transverse linear harmonic vibrations in quadrature.

Fig. 4 shows with some exaggeration, the tube 20 undergoing gyratory elastic motion characteristic of a standing wave for the fundamental resonant frequency of the tube for longitudinally propagated transverse elastic waves. It will be understood from known principles that the standing wave diagrammatically indicated in Fig. 4 results from the transmission down the length of the tube, from the generator 24, of transversely oriented elastic deformation waves, which are reflected from the far end of the tube, and through interference with a succeeding forwardly propagated wave, the standing wave is established somewhat as indicated. It will be seen that nodal points occur at sections of the tube approximately one-fourth the length of the tube from each of its ends, while the two ends of the tube are at antinodes of the standing wave.

The speed of rotation of the inertia ring 33 about the axle 30 is in the first instance determined by the fluid jet which drives it. I have discovered, however, that presupposing a drive of the inertia ring at a number of revolutions per second about the axle 30 which approaches or approximates the resonant frequency of the tube 20 for the described transverse mode of vibration so that the tube 20 and the gyrator housing 24 connected to one end thereof will describe circles of augmented amplitude at the antinodal points, the inertia ring 33 then unexpectedly tends strongly to "lock in" at that frequency, i.e., to spin at a number of cycles per second equal to the resonant frequency for the tube 20 and housing 24. I have further found that the spin speed of the ring tends to lag slightly behind the precise resonant frequency for peak resonant amplitude, or in other words, stays on the low side of the resonance curve. Under these conditions, any tendency for overspeeding of the inertia ring with increased pressure on its driving jet is strongly resisted. The resonantly gyrating tube thus exerts a back reaction on the inertia ring, holding the ring at resonant periodicity, but on the low side of the frequency for peak amplitude, thereby preventing it from over-speeding. In other words, under the constraint imposed by the described back reaction from the resonantly vibrating elastic member, the spin frequency of the ring is held to the resonant frequency of the elastic member, "slipping" to a degree within the driving fluid stream, the fluid jet thus acting as a slip-type drive.

The apparatus of Figs. 1–4 is here shown as equipped with means for introducing a fluid to one end of the tube and discharging it from the other. Thus, an inlet tube 40 coupled to a passageway 41 in member 29 introduces the fluid to be treated to one end of tube 20 and an outlet tube 42 mounted in a plug 43 screwed into the opposite end of the tube 20 communicates via a passageway 44 with tube 20 to withdraw treated fluid. It will be understood that fluid within the tube 20 is subjected to sonic agitation. Various known industrial processes capable of making use of such sonic frequency agitation of liquids or gases form no part of the present invention and need not be described herein.

In Figs. 5–9 I have shown a modification of the orbiting rotor wave generator of Figs. 1–4, improved in the respects of utilizing a cylindrical form of rotor rolling in a cylindrical race, and of use of a plurality of fluid nozzles for driving the rotor.

A cylindrical housing 44 is press-fitted inside the end of fragmentarily illustrated tube 20a, corresponding to the tube 20 of Fig. 1, and has end wall 44a provided with nipple 44b to which is attached compressed air supply hose S. Mounted inside housing 44 are a series of plates, an air inlet plate 45 immediately adjacent wall 44a, a wear plate 46, a raceway plate 47, a second wear plate 46a, and finally an end plate 48, these plates being backed up by a washer 48a, in back of which is a flange 44c formed by spinning over the end portion of housing 44. Raceway plate 47 is centrally bored to form annular raceway 47a, and contained within the chamber defined by this raceway is a cylindrical roller 49, it being noted that the said chamber is defined at the sides by the two plates 46 and 46a. In the present case, the diameter of the roller 49 is a little over half that of the diameter of the raceway 47a, as clearly appears in Fig. 5.

Air under pressure entering through nipple 44b is received initially in a chamber 45a in the front side of plate 45, and flows from there via a plurality of divergent passageways 45b to a corresponding plurality of passageways 45c which extend parallel to the axis of housing 44 from the outer ends of passageways 45b through plates 46, 47 and 46a, to terminate at the adjacent face of plate 48. This air in passageways 45c is discharged into the rotor chamber via nozzle grooves 47b cut in opposite faces of plate 47 and leading from the passageways 45c to the annular raceway 47a, opening into the latter in tangential directions. The tangentially introduced air causes the roller 49 to roll about the raceway 47a, and to exert a gyratory force on the generator casing. The spent air is discharged to atmosphere through ports 46b in the central portion of plate 46a, and a central opening 48b in air exhaust plate 48.

The cylinder roller and bearing arrangement of Figs. 5–9 is of advantage because of low rolling friction, and is especially well suited to relatively high frequencies. It will also be observed that the cylindrical form of roller does not by-pass air around its sides as does a simple ball, and hence is more strongly driven than a ball. The previously described back reaction on the rotor, when the generator is driving a resonant load at the resonant frequency, and which resonant load has greater amplitude in one direction of vibration (such as an elliptically gyratory bar, or a simple lateral vibratory bar), manifests itself as a periodic impulse tending to periodically accelerate the rotor. A single air nozzle has a similar tendency. The provision of a plurality of air nozzles distributed around the race tends toward holding the rotor at a uniform angular velocity.

In Figs. 10 and 11 I have shown another embodiment of the invention, applied ot a sonic-abrasive polishing or grinding machine, and differing from the embodiment of Figs. 1–4 in that the sonic generator is arranged to set up longitudinal vibrations in an elastic bar, as distinguished from the transverse gyratory vibrations of the first described embodiment. In Fig. 10, numeral 50 designates generally a cylindrical elastic bar, composed of some good elastic material such as steel, to the lower end of which has been secured a polishing or grinding head 51 having a flat end extremity 52 adapted to be applied to the surface of the work 53, the work being clamped, as indicated at 54, to the moving bed of a milling type machine fragmentarily indicated by the reference numeral 56.

The bar 50 is resiliently clamped near its upper end by a compliant rubber block or sleeve 57 carried by a suitable supporting ring 58 on an arm extending laterally from a suitable means of support indicated generally at 59.

The sonic vibration generator, designated by numeral 60, comprises a cylindrical body 61 formed at its lower end with a threaded coupling pin 62 screwed into an internally threaded box 63 at the upper end of rod 50. The upper reduced end portion 64 of the body 61 has a fluid passage 65 extending therethrough, to which is coupled, as indicated at 66, a hose 67 understood to be supplied with air under suitable pressure. The body 60 includes a removable body part 60a, meeting the remainder of the body on a vertical medial parting plane 68, and secured in position by suitable screws as shown in Fig. 11. A vertical series of circular chambers 69, here two in number, are formed in the body 60, between the main body part and the insert part 60a, as clearly shown, and axles 70 intersect these chambers, being mounted in the body as illustrated. These axles, whose central portions are preferably crowned, as indicated at 71, support inertia rings 72, of the same general nature as described in connection with Figs. 1–4, the rings 72 being adapted to be rolled about the axles 70 and the centrifugal force of the spinning rings being exerted on the generator housing or body through the axles 70.

The aforementioned fluid passage 65 joins the upper cavity 69 in a tangential direction, as shown; and a passageway 74 extends tangentially to the upper cavity 69 and also tangentially to the lower cavity 69, the arrangement being such however, that the fluid introduced to the two cavities will spin in opposite directions as compared with one another. A tangential outlet passage 75 leads outwardly through the side of the generator body, and the discharged fluid may be received by a stationarily positioned outlet pipe 76, supported separately of the generator.

The inertia rings 72 in the upper and lower cavities are caused to roll on their axles 70, in opposite directions of rotation, by the stream of pressurized air introduced tangentially thereto, as earlier described. As will appear, the air from the source is introduced tangentially to the upper chamber 69, spinning thereabout and forcing the ring 72 to roll about the axle 70. Some of this air is constantly discharged tangentially via the passage 74, to be introduced to the lower chamber 69 in a tangential direction, spinning about the latter chamber in a direction contrary to the spin direction for the chamber immediately above, and accordingly causing the lower ring 72 to spin with a direction opposite to that of the upper ring 72. Air from lower chamber 69 is also constantly discharged tangentially via the outlet passage 75.

In general, pressure fluid circulated successively through the chambers 69 would cause the described rotations of the inertia rings, but without frequency control, and the phase relations between the two rings would be at random. However, when the rings are driven by the stream of pressure fluid so as to spin about the axles at a number of revolutions per second approaching or approximating the resonant frequency of the rod 50 for a longitudinal mode of elastic vibration, the rod 50, as a result of some initial force impact received from the generator, is started into its longitudinal mode of resonant standing wave vibration. The first characteristic longitudinal vibration which will occur is in general that of a free-free bar (i.e., one not rigidly clamped at its ends) vibrating at half wavelength. In this mode of longitudinal vibration, the longitudinal center region of the bar tends to stand substantially stationary while the two opposite end portions thereof alternately move away from and then back toward one another. The bar thus alternately elastically elongates and contracts. It will be seen that as this general type of motion begins to be set up in the rod 50, the sonic generator 60 mounted on its upper end is vibrated longitudinally at the resonant frequency of the rod 50. As a result of this action, the spinning inertia rings 72 synchronize with the longitudinal motion of the upper end portion of the rod 50, and therefore with one another. In other words, the rings orient themselves, though spinning in opposite directions, so as to move in a power delivering phase relationship in the direction longitudinally of the vibrating rod 50. Moreover, as the rings thus synchronize themselves with one another and with the motion of the rod 50, the vertically directed forces which they exert through the generator body against the upper end portion of the rod synchronize with one another, so that the forces become fully additive in the direction longitudinally of the rod. Upon synchronism of the rings 72 being thus achieved, maximum effective force is delivered to the vibratory bar rod 50 in the direction longitudinally thereof, setting the same into high amplitude longitudinal half-wave elastic vibration.

As with the earlier described embodiments of the invention, the resonant frequency standing wave set up in the rod 50 causes the fluid driven inertia rings 72 to "lock in" at resonant frequency, and, as I have found, on the lower side of the resonant curve. Overspeeding of the rings is thus prevented. The rings will be seen to have been synchronized with one another and with the vibrating rod 50 by the back reaction transmitted to them from the rod 50.

Considering further the operation of the tool as a whole, a hose 77 supplies liquid carrying fine particles of abrasive to a nozzle 78 which is directed to the area of the work engaged by the work head 51. According to principles understood in the art, the sonically vibrated work head 51, in cooperation with the abrasive particles carried by the fluid supplied from nozzle 78, generates cutting, grinding or polishing action on the work piece 53. Depending upon the type of polishing or cut desired, various results can be obtained. As shown, the original surface of the work piece is being cut or ground to form a finished surface 53a, this being achieved by passing the workpiece past the working head 51 at right angles. As known in the art, longitudinal holes can also be formed in the workpiece by the obvious step of advancing the cutting tool toward the work, or, of course, advancing the work toward the working head.

In Figs. 12 to 15 is shown an embodiment of the invention in which the orbiting rotor is in the form of an inertia ring driven by magnetic forces rather than a fluid jet. The devices comprises, generally, a gyratory magnetic force generator 99, and second, an elastic bar 100, of circular cross-section, and of good elastic fatigue properties such as steel. This bar is shown solid, though it might be a tube, as described in connection with Fig. 16, and as illustrated in Fig. 24, and might act as a fluid conduit in liquid treatment apparatus.

The generator G comprises a stator 101 and a ring type rotor 102 surrounding an end portion of the bar 100. The stator is similar to the stator of a salient pole type polyphase induction motor. It is composed of a frame 111 in which is mounted an iron core composed of laminated iron rings 112 providing, in this instance, six pole pieces 112a for pole windings 113. The laminated core is secured in assembly by means of end rings 114 and 115 suitably mounted inside frame 111. Frame 111 is provided with mounting feet 111a.

The bar 100 is received at one end portion within the stator 101, with suitable clearance from the pole pieces to accommodate the gyratory ring 102, as shown. It is here illustratively shown as supported directly from the stator through the medium of a surrounding compliant sleeve 116 attached to the stator frame 111 as by means of outwardly extended annular flange 117 and suitable attachment screws. The projecting end of the sleeve 116 is formed with an enlarged clamping ring 119 which rigidly clamps the bar 100. The end portion of the sleeve 116, as well as clamping ring 119, may be radially split as at 121 and clamping screws 122 used to contract the clamping ring about the bar 100. The sleeve 116 must firmly hold the bar 100 and yet be sufficiently compliant to permit some movement of the bar 100 at the clamping point since certain nodes and antinodes will shift along the bar 100 at different vibration frequencies and any clamping point selected will almost inevitably experience movement at one or more frequencies. The compliance of the supporting sleeve 116 may be considerably enhanced if desired, for instance, by providing it with circumferential slots 124 located near its free end.

The point of engagement of the bar 100 by the clamping ring 119 is preferably at a node of a standing wave set up in the bar when vibrating in its fundamental mode, such a node being found approximately one-quarter of the length of the bar from each of its ends. In the present instance, therefore, clamping ring 119 supports the bar at a point substantially one-quarter of its length from its driven end, i.e., its end associated with the stator 101. Other points of support are, of course, possible, i.e., nodal points encountered in various higher modes of vibration, though in view of the compliant character of the support, it is not actually essential that the point of support be located at any nodal point. Surrounding the bar 100, with clearance, within the stator 101, is the ring 102, composed of ferro-magnetic material, and this ring may be axially confined by means of a pair of non-magnetic collars 127 fitted tightly onto the bar 100. The ring 102, when attracted by any one of the pole pieces, is pulled theretoward, and if the pole pieces were to be energized in succession around the stator, the ring would evidently progress from pole piece to pole piece, and thus undergo a gyratory action about the bar 100, the reaction of the spinning ring on the bar setting up a corresponding gyratory action, elastically deforming the bar and thus setting it into a corresponding gyration.

Fig. 15 shows one illustrative system for energizing the pole piece windings so as to set the ring into such spinning action. The numeral 130 indicates a variable frequency source of high frequency polyphase electric current. An alternator designed to generate the necessary high frequency current and capable of being driven through an appropriate speed range, a variable frequency electronic oscillator, or any other source of variable high frequency alternating current may be used. If the internal impedance of this source does not sufficiently match the impedance of the stator coils, an impedance matching transformer may be employed. Thus, as here shown, the current from a suitable three phase source 130 is supplied by leads 131 to the Y-connected primary windings 131 of impedance matching transformer 133. Current is delivered from the secondary windings 134 of the transformer by leads 135 going to the Y-connected windings 113 of stator 101. In the present illustrative case, two series connected windings 113 make up each phase, and these are placed on adjacent pole pieces of the stator, with the windings arranged to give adjacent pole pieces unlike polarities. In the illustrative embodiment, there are six pole pieces, and it will be understood that the two windings 113 of one phase of the Y are placed on two adjacent pole pieces, the two windings 113 of a second phase are placed on the next two adjacent pole pieces, and the two windings 113 of the third phase are placed on the remaining two adjacent pole pieces, the directions of the windings being always such as to give alternately north and south polarities to successive pole pieces.

In addition, it is found preferable to polarize the windings with a direct current, and for this purpose, a battery 140 is shown as connected into the neutral lead 141 of the Y-connected stator coils. Battery 140 supplies the stator coils 113 with a constant direct current which exceeds, or at least equals, the maximum effective value of the current supplied by the alternator, thus producing a net effective current in each pair of adjacent stator coils 113 which is constant in direction of flow but undulating in amplitude. The two series connected windings 113 of the two members of each pair of pole pieces being in opposite directions, so as to give unlike polarities, the magnetic field circuit extends between the pole faces, and the field strength in this region is undulatory in correspondence with the alternating energizing current of the corresponding phase of the system. It will be clear that the field strengths of the three pairs of pole pieces will vary or undulate with 120° phase difference. In consequence, the ring 102 is successively moved by magnetic attraction toward successive pairs of pole pieces as the field strengths therebetween pass through their maximum values. The ring is thus first moved toward one pair of the pole pieces, then toward the second, and then toward the third, and thus is caused to spin or gyrate about the bar 100 in the same manner as in the case of the fluid driven ring of Figs. 1–4, exerting a radially oriented deforming force on the elastic bar in the same manner in Figs. 1–4 and thus setting up transverse gyratory waves in the bar in a manner of the type previously described in connection with these figures. The frequency of gyration is made to correspond to a resonant frequency of the bar, so as to set up resonant standing waves therein, with consequent back reaction to the ring, all as heretofore described in connection with Fig. 1.

In Fig. 16, the gyratory elastic bar 100 of Figs. 1–15, shown in its tubular form in this case, is applied to a liquid body for treatment of the latter, the apparatus being vertically mounted on a suitable support 142, so that the lower end portion of the tube 100 extends within the body 143 of liquid to be treated, contained within a tank 144. Suitable paddles 145 on the lower end of tube 100 within the liquid body produce sonic waves in the liquid body. Simple immersion of the tube 100 within the liquid body is effective, but the paddles 145 provide a liquid coupling means of increased area and are of advantage in generating the desired compression waves within the liquid body. It will be evident that the liquid coupling system of Fig. 16 may alternatively utilize any of my generators of the orbiting rotor type.

Figs. 17 to 20 show an advanced form of sonic vibration generator utilizing an orbital rotor of the fluid-driven, whirling ring type, the generator being illustratively shown as coupled to an end portion of an elastic bar whose opposite end is coupled to a work load, in an arrangement such that a longitudinal standing wave is set up in the bar. This form of generator is particularly adapted for relatively high frequency applications, and as illustrative of its capabilities, I have operated such a vibration generator at a frequency in excess of 15,000 cycles per second. A frequency of this order is possible because the rotor is made of thin cross sections and is of very light weight.

In Figs. 17 and 18, the elastic bar is designated generally at 160. This bar is understood to be composed of some good elastic material such as a good grade of steel or alloy steel. The upper end of this bar 160 is flange-connected, as by bolts, or silver soldering, to the diagrammatically illustrated work load 161, which may be the lower, vibratory wall of a liquid tank whose contents are to be sonically treated, or may be any other device to which vibratory action is to be applied. The lower end of bar 160 is formed with a cylindrical hub 162, into whose bore 163 is press fitted the sonic vibration generator generally designated at 164. Two circular or disk-like side plates 165 are press fitted into bore 163 at a spacing to provide a cylindrical chamber 166 for the presently described rotor 167. The side plates 165 are hollowed out to provide manifold cavities 168, and tightly mount an axial bearing pin 169 which extends across rotor chamber 166.

Rotor 167, which can be fabricated of ball bearing steel, comprises a relatively thin hub 170 receiving pin 169 with a clearance of the typical proportions shown. Integral with hub 170 is a medial, radially extending web 171, on opposite sides of which are impeller vanes 172, formed integrally with hub 170 and web 171. These vanes 172 are curved, as shown best in Fig. 20 and are of substantial area, preferably projecting laterally beyond the ends of hub 170. The vanes are formed with radial, outside edges 173 parallel and very closely spaced to the inside surfaces of plates 165, the clearance being preferably of the order of .001 inch on each side, so as to prevent the rotor wobbling or otherwise becoming unstable in its high speed gyration. I have also found it desirable to provide a very high polish on the inside surfaces of the side plates to as to reduce friction between the rotor and these surfaces to a minimum.

A plurality of nozzle bores 176 are drilled through the inside walls of plates 165 between manifold chambers 168 and rotor chamber 166. These are preferably placed in a circular pattern around pin 169 in a pattern such as indicated in Fig. 19, and are oriented in a tangential direction with reference to rotor chamber 166. They are also preferably so positioned that the fluid jets delivered therefrom impinge on the vanes 172, as near as possible to their innermost junction with the rotor hub, so as to cause the air streams to flow radially outward along the vanes as they deliver energy thereto. It will be evident that this desirable condition can be more fully realized than as shown in Fig. 18, if the rotor hub has less clearance with the pin 169; and excellent performance has been attained in practice with very considerably less clearance proportions than as shown in the illustrative embodiment. The spent air flows off the peripheries of the rotor vanes, and is exhausted via an ample discharge port 177 formed in the periphery of hub 162, as shown best in Fig. 18.

The air manifold chambers 168 are fed via a bore 178 in bar 160 leading from an air inlet to a pair of branch passages 179 communicating with ports 180 in side plates 165 opening into cavities 168. A suitable air conduit connection is made to bore 178 through the side of bar 160 as indicated at 181.

The device thus described operates in accordance with principles and in a general manner discussed hereabove in connection with earlier embodiments of the invention. Two particular features of advantage are afforded by the present device, first, in that the very light whirling ring rotor is adapted for very high frequency operation, and second, in that the impeller vanes formed on the rotor add greatly to the efficiency of the generator, since they extract considerably more work or energy from the nozzle jet streams than can a simple ring or ball.

It will be observed that in the device of Figs. 17 to 20, a longitudinal resonant standing wave is set up in the bar 160 with use of but a single orbiting rotor generator, whereas in earlier described embodiments, a plurality of generators were employed in order to cancel out components of vibration at right angles to the direction of the bar. It is found in practice, however, that substantial vibration amplitude in the bar 160 can be made to occur only at the longitudinal resonant mode of vibration of the bar by selection of rotor size to give a powerful impulse only up in this range, and in the absence of capability for vibration in strong lateral modes at the frequency of the longitudinal mode, the component of force delivered laterally by the rotor causes very little lateral vibration.

The invention further provides a means for reducing or virtually eliminating any tendency for premature resonant "lock in" at unwanted modes of vibration below the desired operating frequency, such as lateral modes, or resonant "bouncing" modes against the load wherein the bar vibrates bodily. It will be evident to those skilled in the art that the bar 160 of Fig. 17 would have a lateral mode of vibration with a resonant frequency lower than its first longitudinal mode. It would be undesirable to permit such a lateral mode to take over control of the rotor, holding back on its ability to climb in frequency up to the desired longitudinal mode. The rotor could be driven hard enough to pass the frequency of the unwanted lateral mode; but it is preferable to suppress vibration at any such model.

To prevent or suppress a lateral mode of such strength, I incorporate vibration damping material at a strategic location relative to the bar. For example, and as shown in Fig. 17, I provide the bar 160 in its central region with a longitudinal slot 185, and place therein a body 186 of viscous, pliable damping material, such as tar, pitch, a thermoplastic, or partially vulcanized rubber. The material introduces shear viscosity damping under the conditions of bending with any tendency for lateral vibration bending modes, so as to prevent any substantial tendency for resonant lock in at such a mode.

To prevent unwanted low frequency longitudinal modes of vibration, such as a resonant bouncing mode wherein the bar vibrates as a whole against the spring action of the load, I preferably surround the bar, in the region of a node of the desired wave pattern (which is the longitudinal center point of the bar in the case of Fig. 17), within an inertia mass ring 187, and I interpose between this ring 187 and the bar a ring-like body 188 of damping material of the same viscous, pliable nature as the already described damping body 186. This damping material, in combination with the inertia ring 187, damps out all longitudinal resonant modes excepting the mode which locates a node of the wave pattern at the damping body.

Figs. 21–23 show another species of rotor-generator in accordance with the invention, powered, illustratively, in this case, by an electric motor which is shaft-coupled to the rotor. Provision is made, particularly for starting purposes, for improving traction between the rotor and its race by insert friction rings, or by magnetic forces, or both. Also, in this case, the generator is illustrated as driving a resonant load which may comprise a vibratory system in which the parameters of mass and elasticity are largely concentrated or localized, such as to behave largely as a lumped constant system, as explained hereinabove.

Numeral 190 designates generally a base frame, composed of a low reluctance material such as cast iron or steel. Frame 190 has a base 191 adapted to be secured down to any suitable foundation, not shown. It mounts at one end an electric drive motor 192 whose shaft 193 is coupled to one end of a quill shaft 194, formed on the end of a relatively long, cylindrical rotor 195. Quill shaft 194 is relatively slender and somewhat flexible, so as to accommodate elastic bending. Frame 190 includes a support 196 for a bearing 197 journalling the end portion of shaft 194 opposite from rotor 195. A suitable coupling between motor shaft 193 and the adjacent end of shaft 194 is shown in Figs. 21 and 23 and may comprise a key 198 of generally H-shape, engaging in notches in the ends of shafts 193 and 194.

Cylindrical rotor 195 is received, with a degree of clearance such as indicated in Figs. 21 and 22, within a bore 199 extending longitudinally through a somewhat elongated rotor race block 200, of generally semi-cylindrical shape in cross-section, affording a flat upper side 200a to which the work load may be secured. In this instance, the work load comprises a tub or tank 201, having preferably an elastically vibratory bottom wall 202 connected as by silver soldering to the upper face of member 200. The inside surface of bore 199 furnishes a circular race for rotor 195.

Tank 201 and rotor race 200 may be provided with any suitable means of support, not shown, capable of both supporting said members, and accommodating the vibratory action thereof. Since it is desired that the mass of member 200 and the vibratory portion of tub 201 be a portion of a resonant vibratory system, an elastically vibratory means is required; and this elastically vibratory means may comprise the elastically vibratory bottom wall of the tub, contents, or may comprise a spring means incorporated in the support for the member 200 and the tub 201. In the latter two cases, the tub, of course, need not have an elastically vibratory bottom, and functions primarily as lumped mass. In the former, the tub, having both substantial mass and substantial capability for elastic vibration, actually has certain distributed constant character.

In operation, rotor 195 rolls around the periphery of bore 199 with a gyrating motion. In order to improve traction between the rotor and the surface 199, particularly for starting, friction rings such as indicated at 204 are set into annular grooves 205 formed in bore 199, and, as here shown, overlying friction rings 206 are also provided in annular grooves 207 around rotor 195. These friction rings can be cork, compressible rubber, or the like. They protrude only slightly above the surfaces into which they are set; and when the rotor 195 is up to speed, the centrifugal force exerted thereby is sufficient that these friction rings compress back out of the way and permit full metal-to-metal contact between the rotor and the surface of bore 199. Such friction rings provide relatively high sliding friction so as to afford good traction for starting. They contribute immaterial rolling friction, however, particularly when the rotor is somewhat up in speed, since the rolling bearing load is assumed primarily by the hard metal surface of the bearing race.

A little consideration will show that, for a rotor whose diameter is a large fraction of the bore in which it works, the rotor will roll many times around the bearing surface 199 for each revolution of the drive shaft. A very desirable frequency step-up feature is thereby attained. It will also be appreciated that quill shaft 194, being slender and somewhat flexible, continually bends as the rotor 195 rolls around its race 199, permitting roller 195 to be in rolling engagement with race 199, while at the same time the remote end of shaft 194, where supported by bearing 196, retains a fixed axial position, such that no gyrational vibration is transmitted to the motor.

The resonant frequency of the driven system is determined by the mass of the vibrating parts, including that of member 200, and the vibrating portion of tank 201 and its liquid body content, and also by the elastic stiffness of the vibratory bottom portion of the tank, or of the tank supporting means, resonance being obtained, of course, at that frequency at which mass reactance is equal in dynamic effect to elastic stiffness reactance. The equipment is so designed that motor 192 will drive rotor 195 at a number of revolutions per second at which the rotor rolls around race 199 at a frequency which is in the range of the resonant frequency of the vibratorily driven system. As this resonance frequency is reached, the vibrating driven system back-reacts through shaft 194 on the drive motor 192 to hold its speed on the low side of the resonance curve, as described in connection with earlier embodiments of the invention. Motor 192 may be an induction motor whose rotor has a capability of "slip" in its rotating field, and readily operates at the resonant frequency of the driven system. The rotor 195 rolling around race 199, sets the member 200, and the bottom wall of tank 201, into gyratory vibration, but usually with a major degree of vibration in one axis. Each point of member 200, and of the resilient tank bottom describes a small circle, or ellipse, owing to the centrifugal force exerted on race 199 during each trip or circuit of rotor 195 around the race. The amplitude of this gyration, i.e., the diameter of the small circle, increases greatly at the resonant frequency, and the system uniquely locks in at resonance, as described in connection with earlier embodiments of the invention.

Friction rings contributing traction between the rotor and its race have already been described, and have been stated to be useful particularly during starting. An alternative means for improving traction will next be described. Frame 190 includes a ring-shaped magnetic yoke 210 surrounding and annularly spaced by a small air gap 210a from one extremity of rotor 95. An arm 211 extends from frame 190, immediately adjacent to ring 210, and is formed at its free end with yoke arms 212 extending closely about race member 200. A magnet coil 213 surrounds arm 211. Thus there is a magnetic flux path through arm 211 between yoke 210 and yoke arms 212. This flux path extends from yoke arms 212 through a narrow air gap to race member 200, which should also be composed of a low reluctance material, and will ordinarily be hardened steel. The flux so fed from yoke arms 212 to member 200 passes through rotor 195, and finally back to yoke 210 and frame 190 via air gap 210a. Energization of coil 213 accordingly results in rotor 195 being attracted to the wall surface 199 of member 200. The rotor is thus held in good frictional contact with the race, and it will be evident that this is true no matter where the rotor is in its path around the race. This bias of the rotor against the race contributes material traction between the rotor and its race, and is a very desirable feature particularly at starting. It should be understood that in a machine of the present type, where there is a large frequency step-up between the driving torque and the rolling contact frequency, a tendency is observed for the rotor simply to roll up the side of the race and then spin and slip thereagainst when the driving power is first applied. The magnetic traction means described, which is preferably in use only at time of starting, holds the rotor tightly against the race, so that adequate driving traction is obtained. It is generally desirable to utilize the magnetic flux for added traction only during starting, since once the machine is well up in speed, centrifugal force is great enough to assure necessary traction. Suitable switching means for this purpose will be within the skill of the art and need not be shown.

The apparatus of Figs. 21–23 is also preferably equipped with a damping means, generally designated by the numeral 220, designed to prevent undesirable vibration patterns. The pattern of principal concern in the present apparatus would result from the possibility of the rotor becoming slightly cocked in its race so that the two ends gyrate with their contact points relatively displaced in angular position. Such a wobbling mode would cause the bearing race to project a rocking vibration into the work load, which is generally undesirable, especially in cases of radiating sound waves into a liquid where a di-pole action is very undesirable.

The damper here shown comprises a pair of fairly limber elastic reed members 215 depending from race block 200, each terminating at its free extremity in an enlarged mass 216. The reed members 215 may be formed by longitudinally slotting a generally T-shaped bar of the proportions illustrated. In the slot between the members 215 is placed a body 217 of viscous material such as tar, pitch, etc. In the event that the race member 200 should tend to vibrate in a "rocking mode," as a result, for example, of the rotor running slightly cocked in the race, the reeds 215 tend to bend, and such bending sets up a viscous shearing action within the damping material 217. Such damping action restrains bending of the reeds, and in turn imposes a restraint on the undesired rocking mode of the race member 200.

Figs. 24 and 25 show a form of the invention incorporated in heat exchange apparatus, with the use of which heat exchange is promoted by dispersion or scrubbing away of heat insulating boundary layer conditions adjacent the heat exchange surface. It is known that the fluid flow along a boundary wall in heat exchange apparatus is subject to viscous flow in a boundary layer adjacent the wall, such flow being characterized by parallel flow of all fluid particles. The majority of heat transfer across this boundary layer of viscous fluid flow characteristics is characterized by conduction, which is of low effectiveness. Gaseous or vapor films may form adjacent the surface, contributing to heat insulating boundary layer effects, and skin frictional drag of the fluid against the surfaces creates a stagnant condition which further inhibits free heat exchange. Application of sound wave vibrations to such a wall in heat exchange apparatus is effective in scrubbing away and dispersing the heat insulating boundary layer, and the form of my invention shown in Figs. 24 and 25 is particularly efficient and effective for that purpose.

In Figs. 24 and 25, numeral 450 designates generally a pipe line for a fluid which, for illustrative purposes, may be assumed to be hot, and which is to be cooled by passing through heat transfer apparatus 451.

Pipe line 450 includes elastic pipe section 452, coupled into line 450 by means of flexible couplings 453, for instance, sections of flexible hose. Pipe 452 should be of good elastic material, preferably a grade of steel having good elastic fatigue properties. Surrounding pipe 452, and annularly spaced therefrom, is a cylindrical external conduit or casing 455, tightly clamped at one end, in fluid sealing relationship to pipe 452 at a point preferably one-quarter of the length of said pipe from one of its ends, in this instance, its upstream end, and a suitable clamping means, such as indicated at 456, is used for the purpose. At its other end, casing 455 is connected to pipe 452 by means of a gland 457 including any suitable resilient packing means 458 permitting some degree of vibration of the pipe. The gland 457 may preferably be located in the region of the other quarter length point of pipe 452. This direction of fluid flow in pipe 452 being assumed to be from right to left as viewed in the figure, the left-hand end of casing 455 is provided with inlet 460 for cooling fluid, and the opposite end thereof is provided with outlet 461 for said fluid.

The right-hand or "upstream" end of pipe 452 is provided with a vibrator 464, illustratively of my orbiting rotor type, capable of generating gyratory vibrations of sonic frequency in pipe 452, and causing them to be transmitted the length of said pipe, and to form an elastic wave pattern along the pipe. The vibration frequency of this generator is preferably so related to the length of pipe 452 as to set up a condition of standing wave resonance therein. For vibration at resonance in the fundamental mode, the pipe 452 should have a length equal to one wave length of the wave produced by generator 464. The generator 464 in this instance comprises a generator housing 465 having a split strap 466 surrounding pipe 452 and set up tightly by means of fastening screws 467. Housing 465 has a circular interior chamber 468 forming a track or race for a steel ball 469, and chamber 468 has concentric ports 470, of lesser diameter than the chamber 468, opening through opposite sides of the housing 465. An air or steam supply pipe 472 connects to the injection nozzle opening 473, arranged tangentially with respect to circular ball race or chamber 468. Air or steam under suitable pressure injected at 473 drives ball 469 around race 468 at a high rate of speed, for example of the order of 60,000 r.p.m., causing the righthand end portion of elastic pipe 452 to be subjected to a rotating force vector which continuously bends it in a circular or gyratory path. If the frequency of rotation of the ball 469 corresponds substantially to the fundamental resonant frequency of pipe 452, said pipe will have a standing wave established therein, with nodes (points of minimum transverse vibration) located at one-quarter of its length from each of its ends, and with antinodes (points of maximum transverse vibration) at its center and at both ends. This standing wave is the result of elastic waves propagated longitudinally along pipe 452 and reflected from its far end, the transmitted and reflected waves interfering in such a way at the resonant frequency as to give the nodes and antinodes as described, all in accordance with fundamental wave theory. The one-quarter length point of the pipe being the location of a node becomes a desirable point for clamping the end of casing 455 thereto. In the present instance, no effort has been made to clamp the other end of casing 455 to the pipe precisely at the other node, and the resilient packing 458 has accordingly been provided to permit yielding with the vibratory action of the pipe at the point of connection. The vibratory action of pipe 452 will accordingly be transmitted to the liquid within the annular space between said pipe and the casing 455, but it will not be substantially transmitted to casing 455. The vibratory action of pipe 452 will of course be transmitted to the liquid flowing within itself.

The back-reaction effect of the pipe 452 vibrating at resonance again controls the spin frequency of the ball, giving a resonant lock-in effect as described earlier herein.

Considering again the boundary layer conditions adjacent both the inner and outer surfaces of pipe 452, thin films of dormant liquid, steam, vapor or gas may collect along either of said surfaces and effectively insulate against rapid heat transfer, as previously described. Moreover, conditions of viscous flow, as previously described, may prevail adjacent both the inner and the outer surfaces of pipe 452 for a substantial proportion of its length, and may militate against effective heat transference by convection flow, as well as by direct conduction, also as previously described. But with the gyratory vibration of the pipe 452 rising to maximum amplitude at the mid-section of the pipe, vapor or gaseous films adjacent both surfaces of the pipe, as well as the viscous boundary layer, are severely agitated, broken up and dispersed, bringing about intimate contact of the inner and outer fluids with the pipe 452, as well as a condition of turbulent flow both inside and outside the pipe 452, with increase in the heat transfer rate in accordance with principles already described.

Although the above described illustrations show a roller or a ring rolling around on a circular bearing means, it should be recognized that such choice of illustrations is not limitative on the invention in its broad aspect. Actually, a rolling mass, or a bearing means on which it rolls, can be made in many different shapes. A multi-lobed cam shape for either surface is very desirable in many cases, because by such means I have found it possible to generate high frequency cycles. Such a multi-lobed cam will give equally multi-cycle frequency gain for each basic, or primary, cycle of the mass. For this reason I speak herein of the frequency generated by the cyclic mass, rather than just the frequency of the basic, or primary, cycle of the mass. The primary orbital spin frequency can be damped out, and the higher secondary frequency, and the lower frequency primary nate and control simply by utilization of vibration damping means of the type disclosed at 187 and 188 in Fig. 17. Thus the vibratory bar can be designed for standing wave vibration (e.g., at half wave length) at the secondary frequency, and the lower frequency primary or orbital spin frequency, which may tend to cause vibration of the bar as a whole, can then be damped by location of a means such as 187, 188 of Fig. 17 at a node of the desired secondary frequency. The frequency generated, particularly when the orbital spin frequency is damped out in the driven device, will be seen to be that generated by the orbiting rotor owing to its radial component of motion, rather than the orbital spin frequency.

It will be appreciated that the various forms of vibratory devices of the invention will have one or more resonant frequencies or resonant frequency ranges, such as fundamental, or other frequency modes; and it is to be understood that, within the broad scope of the invention, the resonant frequency or resonant frequency range chosen in any particular application may be either the fundamental, or any other desirable frequency mode. The important consideration is that a resonant frequency be used.

When considering the orbital path it is important that the well-known laws of acceleration be recognized, because it is the phenomena of acceleration which necessarily causes the above-mentioned periodic force generation by the periodic movement of the mass. Acceleration is inherently the most important phenomena involved in orbital movement. Acceleration basically consists of the phenomena of change of velocity. Change of velocity, of course, involves change of direction, or change of speed, or a combination of both. Most practical examples of acceleration involve both change of direction and change of speed. Most forms of this invention involve this combined form of acceleration, as will be evident from a study of the examples cited.

The authorities consider the various classical examples of orbital paths to be forms of ellipses. In this regard a circle is considered one form of ellipse. With a circular orbit the acceleration is usually a uniform change of direction, with no change of speed. Ellipses can have various ratios of major to minor axis, the limiting well-known cases being the circle as one limit and practically a straight line of linear reciprocation as the other limit. In any non-circular ellipse the all-important acceleration phenomena is concentrated at the two ends of the pattern. Here we have a combination of change in direction and in speed. In many of the examples described herein the orbital motion of the mass is necessarily some form of non-circular ellipse path, as above described. In many cases the shape of the path in space changes during operation, such as from changes in work load, being influenced by the vibration pattern of the resonant member to which it is coupled.

As will be evident from a study of the figures, some of the resonant members require that the resultant of the orbital excitation be circular; and some require that the resultant of the orbital path be linear. The cyclic (obital) motion of the moving mass need not in all combinations correspond exactly with the shape of vibratory motion path carried on by the elastic member. The elastic member in some cases shown herein has a definite resonant response consisting of linear vibration. In such cases the excitation orbit can, of course, also be linear in effect by any convenient means, or it may be a more circular ellipse. In the latter such cases the sharpness of tuning of the resonant member will cause it to vibrate predominantly in a straight line, and will cause the mass orbit to become predominantly ellipsoidal, sometimes substantially a straight line, even when the mass orbit by itself be very circular. As can be seen it is only necessary that the orbiting mass and the resonant member be intercoupled with a common component of cyclic force in order to be able to have the back-reaction effect which is the key to this invention. Obviously, either the resonant member or the accelerating excitation mass in the novel combination can have any of the classical forms of closed cyclic (orbiting) path, depending upon the needs of the situation. The guidance and path limiting means can thus be arranged to cause the inertial mass to be constrained to any shape of closed cyclic path, including circles, straight lines, rippled or cammed circles, cammed ellipses, various other ellipses, etc., so long as the path limiting means receives the impulses from the mass and is coupled to the resonant means in vibration transmitting relationship so that the acceleration impulses are transmitted thereto.

The invention has now been described in various forms and applications, which are illustrative and from which its broad scope may be understood. Moreover, it can be seen that many of the features illustrated for convenience in certain embodiments apply equally well to other embodiments. It is of course to be further understood that these are not limitative or a restriction on the scope of the broad invention, excepting as may be fairly construed from the following claims.

I claim:

1. The method of generating sonic elastic vibration in an elastic member capable of resonant vibration in a characterisctic frequency range, comprising the steps of: driving a mass repeatedly along a closed orbital path by applying a driving force thereto, confining said mass to movement in said path, coupling said mass in vibration transmitting relationship to said member, and thereby causing said mass to vibrate said member, and exerting only sufficient driving force on said mass to bring the frequency of vibration of said member, caused by said movement of said mass in said path, to a frequency which is near to but not exceeding the peak amplitude resonant frequency of said elastic member so that said frequency caused by said mass becomes locked into said resonant frequency.

2. The method of generating sonic vibrational energy with an orbiting mass and simultaneously governing the speed of said mass, comprising the steps of: driving said mass repeatedly along a closed orbital path by applying a driving force thereto, confining said mass to movement in said path, holding said path in coupled relation to a vibratory part of an elastic member and exerting only sufficient driving force on said mass to bring the frequency caused by said movement of said mass in said path to a frequency which is near to but not exceeding the peak amplitude resonant frequency of said elastic member so that said frequency caused by said mass becomes locked into said resonant frequency.

3. In a sonic vibration process, the steps of: driving a mass repeatedly around a closed orbital path by applying a driving force thereto, confining said mass to movement in said path and thereby creating a periodic impulse, coupling a component of said periodic impulse to a vibratory portion of a resonant elastic member and thereby causing said mass to vibrate said member utilizing said vibration of said elastic member to effect said sonic vibration process, exerting sufficient driving force on said mass to bring the frequency of vibration of said elastic member, caused by rotation of said mass around said path, to a frequency within the range of a resonance of said elastic member and thereby causing amplified vibration of said elastic member, and maintaining said driving force at a value less than the threshold value where the frequency generated by said mass breaks over the peak of said resonance, so that the frequency generated by the movement of said mass around said orbital path is held back by the elastic vibration of said vibratory portion of said resonant elastic member below said frequency for peak resonance.

4. In a sonic vibration system, the combination of: an elastic member having a resonant frequency and a part free to vibrate elastically at said frequency, and sonic vibration generating means for generating vibration in said member at said resonant frequency thereof comprised of a bearing means fixed to said free part of said elastic member to vibrate therewith, an inertia rotor guided by said bearing means for turning in an orbital path, and driving means for driving said inertia rotor around said path to vibrate said member at a frequency in the region of said resonant frequency, but on the low side thereof, of said elastic member, said driving means being arranged to deliver a driving force limited to a value less than that necessary to drive said rotor over said resonant frequency so that said inertia rotor assumes and holds a synchronous relation to the elastic vibration of said free part even upon a subsequent variation in said driving force below said peak resonant frequency.

5. In sonic vibration processing means, the combination of: an apparatus having a vibratory work-delivering part in combination with an elastic member having a resonant frequency range and a part free to vibrate elastically in said frequency range, said resonant frequency range being characterized by having a frequency at which the vibration amplitude has a peak maximum value, and sonic vibration generating means for generating vibration in said elastic member in said resonant frequency range thereof comprised of a bearing means coupled to said free part of said elastic member to vibrate therewith, an inertia rotor guided by said bearing means for rotating in an orbital path, and driving means for driving said inertia rotor around said path to vibrate said elastic member at a frequency in said resonant range, said driving means having a driving force on said rotor which is less than the threshold value which will cause said resonant peak amplitude, so that said inertia rotor assumes and holds a synchronous relation to the elastic vibration of said free part below the frequency for said peak amplitude.

6. The subject matter of claim 5 in which said bearing means is a shaft member having a bearing surface thereon, and said rotor is a ring-shaped member which has an inside diameter greater than the outside diameter of said shaft member so that said ring-shaped member swings about said shaft member with rolling bearing contact action.

7. The subject matter of claim 5, in which said elastic member is an elastic bar which resonates in a longitudinal mode.

8. The subject matter of claim 5, in which said elastic member is a structure which resonates in a bending mode.

9. The subject matter of claim 5, in which said bearing means comprises a race having an interior cylindrical bearing surface, and said rotor is a cylindrical roller rolling on said bearing surface.

10. The subject matter of claim 5, wherein said driving means comprises a plurality of fluid nozzles directed against said rotor at a plurality of spaced points in its orbital path.

11. The subject matter of claim 5 in which said driving force is provided by an electromotive means.

12. In sonic vibration processing means, the combination of: an apparatus having a work-delivering part in combination with a vibratory means having vibratory mass and elasticity providing a resonant frequency range, and including a part free to vibrate in said frequency range, said resonant frequency range being characterized by having a frequency at which the vibration amplitude has a peak maximum value, and sonic vibration generating means for generating vibration in said vibratory means in said resonant frequency range thereof comprised of a bearing means coupled to said free part of said vibratory means to vibrate therewith, an inertia rotor guided by said bearing means for rotating in an orbital path, and driving means for driving said inertia rotor around said path to vibrate said vibratory means at a frequency in said resonant range, said driving means having a driving force on said rotor which is less than the threshold value which will cause said resonant peak amplitude, so that said inertia rotor assumes and holds a synchronous relation to the vibration of said free part below the frequency for said peak amplitude.

13. In sonic vibration processing means: a sonic vibration generating means for use with an apparatus having a vibratory work-delivering part in combination with an elastic member having a resonant frequency range and a part free to vibrate elastically in said frequency range, said resonant frequency range being characterized by having a frequency at which the vibration amplitude has a peak value, said sonic vibration generating means having an operating frequency for generating vibration in said elastic member in said resonant frequency range thereof, and having a bearing means with coupling means for coupling to said free part of said elastic member to vibrate therewith, an inertia rotor guided by said bearing means for rotating in an orbital path, and driving means for driving said inertia rotor around said path to vibrate said elastic member at a frequency in said resonant range, said driving means having a driving force on said rotor which is less than the threshold value which will cause said resonant peak amplitude, so that said inertia rotor assumes and holds synchronous relation to the elastic vibration of said free part even upon a subsequent variation in operating conditions below the frequency for said peak amplitude.

14. The subject matter of claim 13, in which said bearing means comprises the inside surface of a bearing race and said rotor is a rolling member which rolls around said inside surface.

15. The apparatus of claim 13, in which said driving force is provided by a jet nozzle which directs a flow of fluid against said rotor.

16. In a sonic vibration generating and transmission system, the combination of: a longitudinal elastic bar for longitudinal transmission of vibratory energy, vibration generating means for subjecting one portion of said bar to a radially directed force vector turning about the longitudinal axis of said bar at a standing wave frequency of the bar and capable of elastically deflecting said bar so as to cause said portion of the bar to gyrate in a closed path, and means for taking gyratory vibratory energy from a portion of said bar which is longitudinally spaced from the first-mentioned portion.

17. The method of generating and transmitting sonic vibrations which includes: compliantly supporting a long elastic bar, transversely deforming said bar by applying a bending moment to it near one end thereof and in a plane through its longitudinal axis; and rotating the plane of said bending moment about the longitudinal axis of said bar at a uniform angular velocity so related to the length of the bar as to establish transverse standing waves and a condition of substantial resonance therein.

18. The method of treating a fluid with sonic vibrations which includes passing the fluid through an elastic tube in which gyratory standing wave vibrations are generated by moving at least one transverse section thereof in a closed substantially circular path at a frequency sufficiently high relative to the length of the tube to establish a standing wave pattern along the tube.

19. The method of treating a fluid with sonic vibrations which includes passing the fluid along an elastic bar in which gyratory standing wave vibrations are generated by moving at least one transverse section thereof in a closed substantially circular path at a frequency sufficiently high relative to the length of the tube to establish a standing wave pattern along the tube.

20. In a sonic vibration generating and transmission system, the combination of: an elongated elastic bar, and vibration generating means for subjecting one portion of said bar to a radially directed force vector turning about the longitudinal axis of said bar at a standing wave frequency of the bar and capable of elastically deflecting said bar so as to cause said portion of the bar to gyrate elastically in a closed path, whereby gyratory elastic waves are transmitted longitudinally along the length of the bar and a standing wave is set up therein, a portion of said bar longitudinally spaced from said first-mentioned portion constituting an elastic vibratory energy-delivering means.

21. A sonic vibration generator and transmitter, comprising: a gyrationally compliant elastic bar, and means for subjecting a limited linear portion of said bar to a rotating deflecting force intersecting and turning about an axis parallel to the bar, at a frequency sufficiently high relative to the length of the bar to cause propagation of elastic gyratory waves along the bar, reflection thereof from the ends of the bar, and a resultant gyratory wave pattern along the length of the bar.

22. A sonic vibration generator and transmitter, comprising: a gyrationally compliant elastic bar, and means for subjecting a limited linear portion of said bar to a rotating deflecting force intersecting and turning about an axis parallel to the bar, at a frequency corresponding substantially to a resonant frequency of the bar for a transverse mode of vibration, whereby to produce a gyratory wave pattern along the bar characterized by nodal and antinodal regions, of minimized and maximized elastic gyratory deflection amplitude, respectively, at stations spaced by a quarter wave length distance along the bar.

23. The subject matter of claim 22, including means compliantly supporting said bar at a nodal region of the wave pattern in the bar.

24. In a sonic vibration generating and transmission system, the combination of: an elongated elastic bar, vibration generating means for subjecting one portion of said bar to a radially directed force vector turning about an axis extending longitudinally of the bar at a standing wave frequency of the bar and capable of elastically deflecting said bar so as to cause said portion of the bar to gyrate elastically in a closed path, whereby gyratory elastic waves are transmitted longitudinally along the length of the bar, and a standing wave is set up therein, a portion of said bar longitudinally spaced from said first-mentioned portion constituting an elastic vibratory energy-delivering means.

25. In heat exchange apparatus, a pipe of elastic material adapted for fluid flow therethrough, means mounting said pipe with its ends and its central section free for transverse vibration, a fluid tank surrounding a portion of said pipe, said tank having inlet and outlet connections, and a gyratory vibration generator coupled to said pipe and arranged with said pipe to cause gyratory wave action in a transverse plane to be propagated along the length of the pipe.

26. An apparatus as defined in claim 25, wherein the gyratory wave generator operates at a resonant frequency of the pipe, so as to establish a standing wave in the pipe.

27. In heat exchange apparatus, a pipe of elastic material adapted for fluid flow therethrough, means mounting said pipe with its ends and its central section free for transverse vibration, a fluid tank surrounding a portion of said pipe, said tank having inlet and outlet connections, and a gyratory vibration generator mounted directly on said pipe outside said tank and arranged with said pipe to cause gyratory wave action in a transverse plane to be propagated along the length of the pipe.

28. The subject matter of claim 5, wherein said work delivering part comprises a surface coupled to a liquid body for producing sonic waves therein.

29. The subject matter of claim 12, wherein said driving means for driving said inertia rotor comprises a shaft connected to said rotor, and motor means coupled to said shaft for rotatably driving said shaft and rotor with said driving force under control of back reaction transmitted from said vibratory means through said bearing means, rotor and shaft.

30. The subject matter of claim 12 wherein said vibratory means includes a liquid body coupled to a surface of said work delivering part for producing elastic vibrations in said liquid body.

References Cited in the file of this patent

UNITED STATES PATENTS

| Number | Name | Date |
|---|---|---|
| 942,396 | Lincoln | Dec. 7, 1909 |
| 1,082,285 | Peterson | Dec. 23, 1913 |
| 1,552,433 | Hills | Sept. 8, 1925 |
| 1,862,356 | Warren | Mar. 19, 1932 |
| 1,882,401 | Pierce | Oct. 11, 1932 |
| 1,979,548 | Horsch | Nov. 6, 1934 |
| 2,016,974 | Thomas | Oct. 8, 1935 |
| 2,059,239 | Jackson | Nov. 3, 1936 |
| 2,138,051 | Williams | Nov. 29, 1938 |
| 2,143,610 | Muller et al. | Jan. 10, 1939 |
| 2,174,013 | Schrey | Sept. 26, 1939 |
| 2,194,410 | Svenson | Mar. 19, 1940 |
| 2,204,472 | Caquot | June 11, 1940 |
| 2,304,793 | Bodine | Dec. 15, 1942 |
| 2,308,298 | Newhouse | Jan. 12, 1943 |
| 2,343,738 | Bechmann et al. | Mar. 7, 1944 |
| 2,376,221 | Baker | May 15, 1945 |
| 2,393,045 | Hotchner | Jan. 15, 1946 |
| 2,398,455 | Unger | Apr. 16, 1946 |
| 2,420,793 | O'Connor | May 20, 1947 |
| 2,439,499 | Williams et al. | Apr. 13, 1948 |
| 2,453,595 | Rosenthal | Nov. 9, 1948 |
| 2,454,620 | Wilde | Nov. 23, 1948 |
| 2,460,919 | Bodine | Feb. 8, 1949 |
| 2,468,515 | Robinson | Apr. 26, 1949 |
| 2,468,837 | Peek | May 3, 1949 |
| 2,478,207 | Robinson | Aug. 9, 1949 |
| 2,496,291 | High | Feb. 7, 1950 |
| 2,498,990 | Fryklund | Feb. 28, 1950 |
| 2,511,178 | Roters | June 13, 1950 |
| 2,518,250 | Peterson | Aug. 8, 1950 |
| 2,524,573 | Roberson | Oct. 3, 1950 |
| 2,528,319 | Peterson | Oct. 31, 1950 |
| 2,535,596 | Peterson | Dec. 26, 1950 |
| 2,566,984 | Firth | Sept. 4, 1951 |
| 2,578,505 | Carlin | Dec. 11, 1951 |
| 2,607,569 | Pierre | Aug. 19, 1952 |

FOREIGN PATENTS

| Number | Country | Date |
|---|---|---|
| 424,955 | Great Britain | of 1933 |
| 532,144 | Great Britain | of 1941 |
| 316,499 | Germany | Dec. 2, 1919 |
| 832,891 | France | of 1938 |

OTHER REFERENCES

"Electronics," April 1950, "Pin-Pointing Ultrasonic Energy," pages 84–85.